Oct. 18, 1966
R. LICHTNER
3,279,311
DEVICE FOR PRODUCING AN EVEN DISTRIBUTION OF
LIGHT ON A COPYING FRAME
Filed Sept. 30, 1964
3 Sheets-Sheet 1
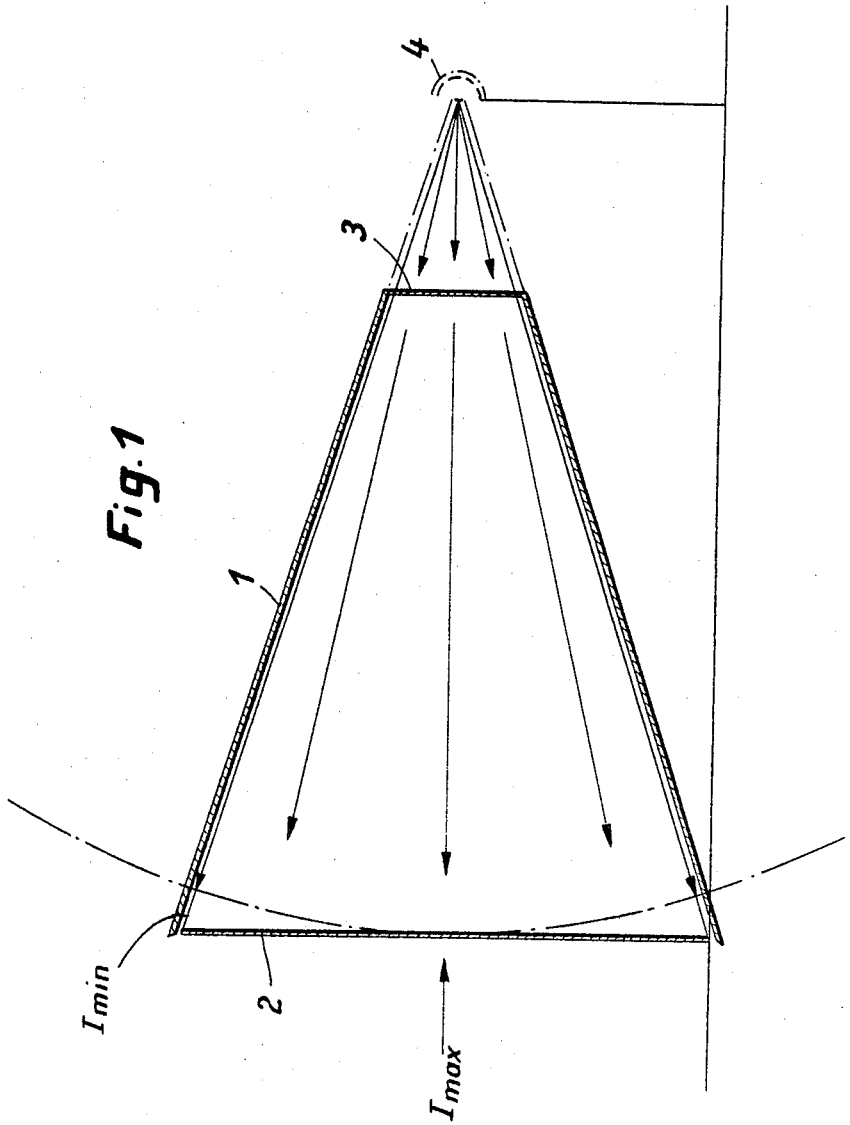
INVENTOR.
Rudolf Lichtner
BY
Beaman & Beaman
attys

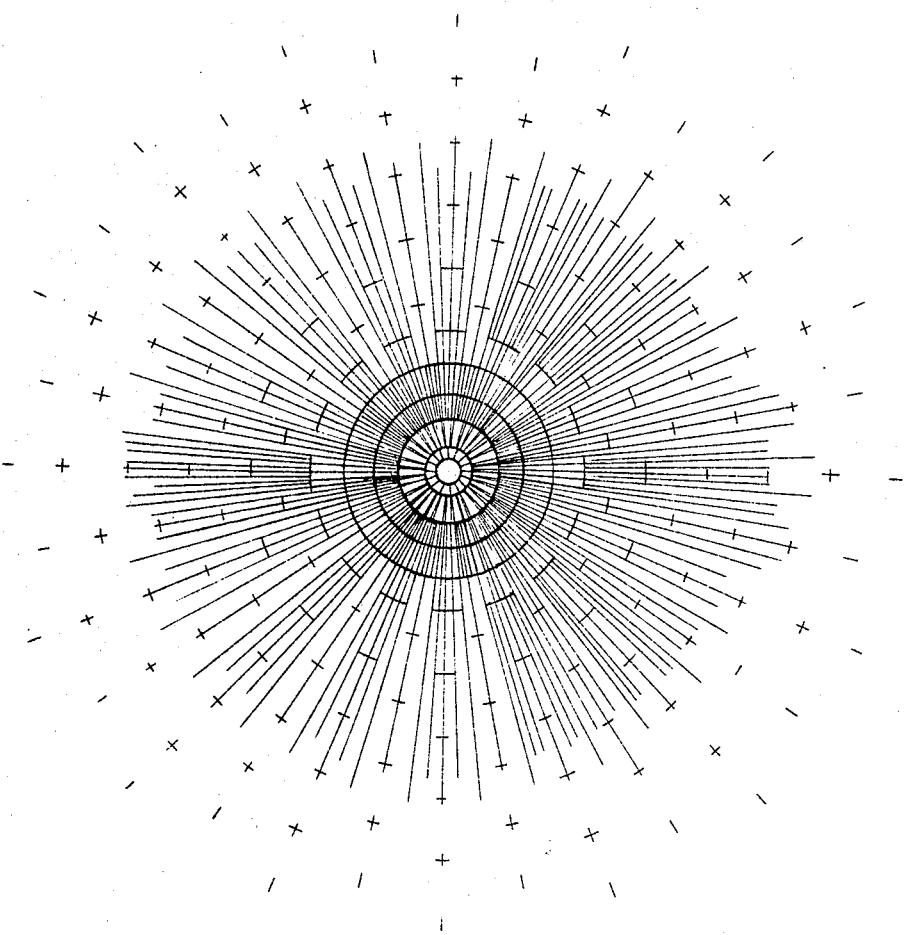

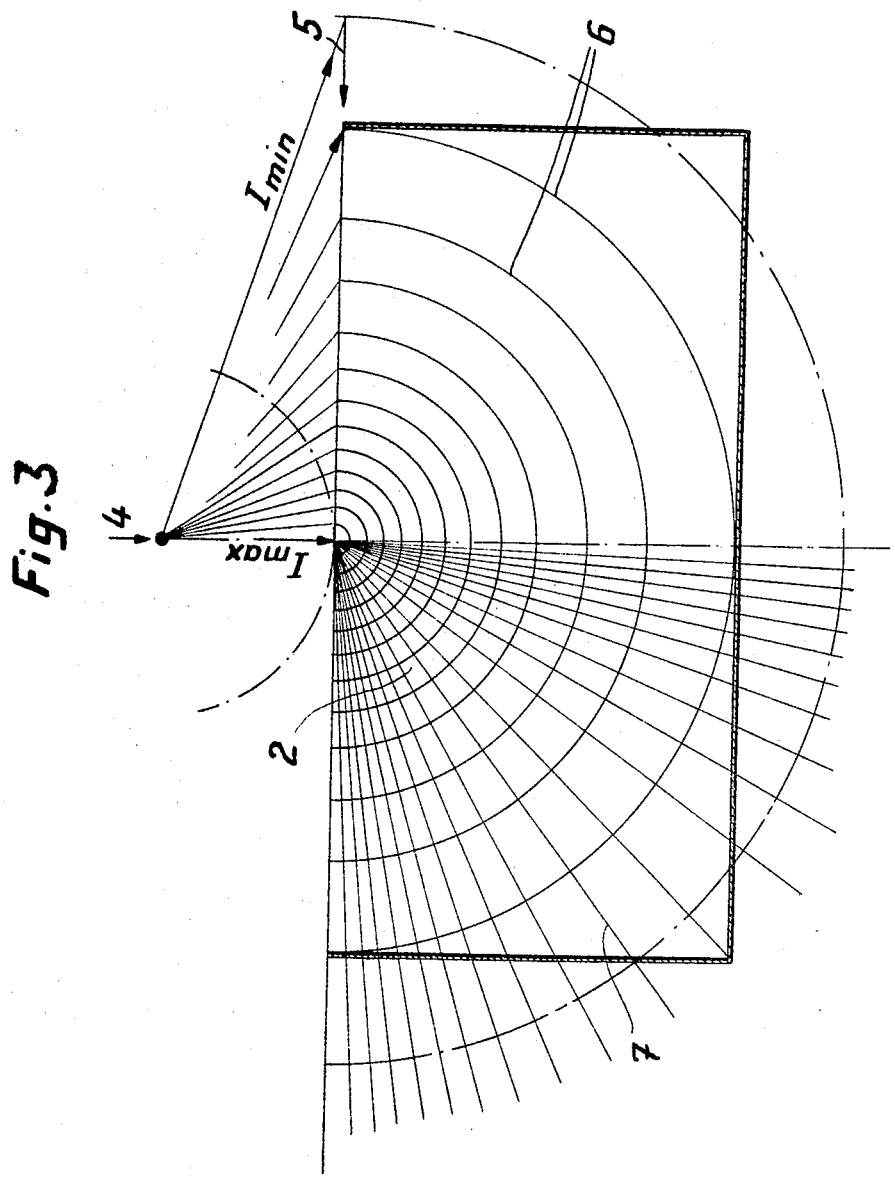

United States Patent Office 3,279,311
Patented Oct. 18, 1966

3,279,311
DEVICE FOR PRODUCING AN EVEN DISTRIBUTION OF LIGHT ON A COPYING FRAME
Rudolf Lichtner, Itzehoe, Germany, assignor to Gruner & Sohn, Itzehoe, Germany
Filed Sept. 30, 1964, Ser. No. 400,466
Claims priority, application Germany, Oct. 10, 1963, G 38,890
8 Claims. (Cl. 88—24)

The invention relates to a device for producing an even distribution of light on a copying frame which is illuminated by a source of light and in which diapositives are copied on light-sensitive material.

In intaglio printing, one operation consists in copying the diapositive produced from the negative on to carbon or pigment paper or other light-sensitive material, the coating of which is then transferred to the impression cylinder. The copying on to the light-sensitive material is divided into two steps namely, on the one hand, the copying of the screen and, on the other hand, the copying of the diapositive montage. In this operation the copy should provide a tone scale of the same range as that exhibited by the diapositive. For this purpose it is necessary, on the one hand, to choose a good light-sensitive material and, on the other hand, that the copying arrangement should operate in the optimum manner and, in particular, care must be taken that there is an even distribution of light over the copying frame.

The light is thrown from punctiform light sources, for example arc lamps, on to the diapositives which rest layer on layer on the carbon paper or other light-sensitive material in the copying frame. Originally, the copying frame was illuminated by four or six arc lamps. Today, however, a change has been made to the use of a punctiform light source of high power which, as compared with the use of four to six lamps, results in a simplification of the lighting arrangement and thus gives rise to advantages in maintenance. The drawback of this arrangement consists in that relatively large copying frames are not evenly illuminated. The uneven illumination results in an irregular hardening of the light-sensitive coating on the light-sensitive material at places which should have the same hardness because they have the same tone value.

It is therefore an object of the invention to provide means enabling an even distribution of the light to be produced. According to the invention, this object is achieved in that in the path of the light rays between the light source and the frame there is provided a diaphragm consisting of transparent material to which opaque circles arranged concentrically around the optical axis and opaque lines extending radially from the concentric circles in the form of rays have been applied.

Diaphragms of the most diverse types and for the most varied applications are already known. For example, in a process for the autotype breaking up of halftone originals by means of a screen and a diaphragm in the screen printing process, it is known to interpose in the path of the rays a diaphragm having a large number of apertures of different diameters, aperture of the same diameter being so arranged concentrically that a maximum brightness occurs at the centre and a second such maximum outside the centre towards the edge of the diaphragm. However, in the first place this diaphragm has a different purpose and, moreover, it is differently designed; finally, the result obtained with it is different from that obtained in the case of the diaphragm of the invention. With the diaphragm used according to the invention, even brightness is obtained over the entire copying frame. At the same time, the diaphragm of the invention also overcomes the difficulty that the frame is rectangular and not square or circular. Thus, by means of the invention, the advantage is obtained that the light intensity can be retained without substantial reduction, i.e. the exposure time can be maintained at substantially the same value as has been determined for an arrangement without the diaphragm of the invention. Moreover, the device according to the invention has the advantage that it can be manufactured without great expense. Furthermore, it is not subject to any chemical, physical or mechanical changes or to wear. These advantages are particularly apparent if, in accordance with an advantageous optional feature of the invention, the plate of heat-resistant glass which separates the light source from the copying chamber is employed as the diaphragm. In fact, in copying arrangements of the type to which the invention is primarily applicable, it is customary for the copying frame to be arranged at one end of a funnel in the form of a truncated pyramid of rectangular cross-section, and in fact at the end of larger cross-section, while the light source is arranged at a certain distance from the other end of this funnel. The end of the funnel which is of smaller cross-section is covered with a heat-resistant glass plate which keeps the radiant heat away from the copying frame. As an advantageous further development of the invention, the concentrically arranged opaque circles and the opaque lines radiating from the concentric circles are applied to this heat-resistant glass plate.

In order that the invention may be clearly understood, a preferred constructional form of the device of the invention will now be described, by way of example only, with reference to the accompanying drawings, in which:

FIGURE 1 shows the construction of copying arrangement purely diagrammatically and FIGURES 2 and 3 show suitable designs of the diaphragm according to the invention, with concentric circles and radiating lines.

Referring to the drawings, a copying arrangement of the kind to which the invention is intended to be applied consists of a funnel 1 in the form of a truncated pyramid having a rectangular base surface. During the copying process the larger base of this truncated funnel is closed by a copying frame 2 which is pivotable in a known manner, so that the carbon or pigment paper or other light-sensitive material and the dispositives can easily be mounted thereon, secured and then brought in front of the funnel. The smaller base of the truncated funnel is closed by a heat-resistant, light-transmitting plate 3, generally of safety glass, which keeps the major part of the radiant heat issuing from a light source 4 away from the copying frame 2. The light source 4 is generally a punctiform light source, for example a three-phase arc lamp, which is arranged on the optical axis of the system, i.e. substantially on the central axis of the truncated funnel, at a suitable distance from the said truncated funnel and from the copying frame 2. Without the provision of supplementary means the light source 4 would produce uneven illumination of the copying frame within the limits $I_{max}$ on the optical axis and $I_{min}$ at the corners, so that the coating of the light-sensitive material would be hardened and exposed unevenly at the places where it should be evenly hardened and exposed because those places have the same grey tone.

In accordance with the invention, however, a diaphragm or mask is interposed in the path of the rays between the light source 4 and the copying frame 2. It is advantageous to apply this diaphragm direct to the plate 3. An advantageous embodiment of the diaphragm is shown in FIGURE 2. It consists of a plate carrying concentric circles of opaque material and lines of opaque material extending in the form of rays, that is to say, radiating from the circles. It has proved to be simplest to apply these circles and lines of the plate simply by the use of heat-resistant opaque paint. With the construction of diaphragm illustrated in FIGURE 2, no loss of light worth mentioning occurs, this being attributable to the diffraction of light, so that it is possible to retain the exposure time of about 6 minutes which has been established without the use of much a diaphragm. This exposure time is relative and is dependent on the sensitivity of the light-sensitive coating, on the transparency or original to be copied and on the intensity of the light source. The zone inside the innermost concentric circle is free from lines. A certain number of rays commence on the first concentric circle and where the second concentric circle begins, a larger number of rays is added to these rays. The outer concentric circles are present only in the form of fragmentary circles, the sum of the lengths of the circular fragments becoming smaller and smaller. The parts of the fragmentary circles which are present are staggered with respect to the parts of the preceding circle, the parts of each successive fragmentary circle being arranged in each instance between the parts of the preceding fragmentary circle. In this way a symmetrical distribution of the fragmentary circles is obtained.

As the copying frame is rectangular, asymmetry in the paths of the rays is provided in order to achieve even illumination. The rays which start from the first and second concentric circles are supplemented by rays which, in the embodiment described, start from the second concentric circle and which, in the longitudinal direction of the copying frame, extend as far as the outside, while in the other parts of the frame they extend only as far as the last solid concentric circle. In this way, even illumination of the corners of the copying frame is also obtained. The rays end substantially on two non-solid circles. Moreover, the intersections of the fragmentary circles and fragmentary lines also define points which assist in the even distribution of the light.

To assist in insuring even distribution of the light, it has been found to be advantageous to line the inside of the copying housing 1 with black material, so that there is substantially no reflection of light rays at the wall of the housing.

The form of diaphragm shown in FIGURE 2 was developed for one specific application. It is probable that for other conditions the details of the arrangement of the diaphragm would have to be designed otherwise. Fundamentally, however, the diaphragm required would still comprise circles of opaque material arranged concentrically around the optical axis and lines of opaque material in the form of rays starting from the concentric circles. The method by which the diaphragm then is to be produced is shown in FIGURE 3. Here, the copying frame 2 with the light-sensitive material is assumed to be hinged into the plane of the drawing, but actually it is located in the plane 5 at right angles to the plane of the drawing. Starting from $I_{max}$, there is a drop in the intensity of the light which continues as far as $I_{min}$ and which increases with the square of the distance from the light source. It is important to increase the effect of the diaphragm at the areas of maximum intensity and to reduce it at the areas of small intensity and this is achieved by providing a variation of the radii of the circles 6, the radii becoming greater and greater in accordance with the drop in intensity. The varying density of the rays 7 is conditioned by the smaller distance at which the centres of the edges of the copying frame are spaced from the light source as compared with that of the corners, which distance must likewise be compensated for.

It is worthy of note that the inner circle, which theoretically would have to be covered most, is completely open in FIGURE 2. This is due to the fact that, in practice, there is no such thing as a punctiform light source and the defined spot of light generated by the light source is constantly changing.

What I claim is:
1. In an illuminating device comprising a source of light, a copying frame having an area which is to be illuminated, and mounting means to mount said frame at a predetermined distance from said light source with said light source lying substantially symmetrical with respect to said area, a diaphragm interposed in the light path between said light source and said area, said diaphragm consisting of transparent material and having opaque circular lines arranged in radially spaced relationship concentrically around the point where the optical axis of said illuminating device penetrates said diaphragm, and said diaphragm further having opaque straight lines extending radially with respect to said point and radially outwards from said circular lines, said circular lines and said straight lines being arranged so as to provide a substantially even distribution of light on said area of said copying frame.

2. In an illuminating device comprising a source of light, a copying frame, an area of which is to be illuminated, and mounting means to mount said frame at a predetermined distance from said light source with said light source lying substantially symmetrical with respect to said area, a diaphragm interposed in the light path between said light source and said area, said diaphragm consisting of transparent material and having opaque circular lines arranged in spaced relationship concentrically around a point where the optical axis of said illuminating device penetrates said diaphragm, the outer ones of said circular lines having interruptions to form fragmentary circles, and said diaphragm further having opaque straight lines extending radially outwards from said circular lines, said circular lines and said straight lines being arranged so as to provide a substantially even distribution of light on said area of said copying frame.

3. In an illuminating device comprising a source of light, a light channel having the form of a truncated pyramid of rectangular cross-section and including a large base face and a small base face, a copying frame arranged at said light channel large base face having an area which is to be illuminated, mounting means mounting said frame at a predetermined distance from said light source with said light source lying substantially symmetrical with respect to said area, a transparent shield plate arranged at said light channel small base face interposed between said light source and said copying frame area whereby light falling upon said area passes through said shield plate, opaque circular lines arranged in spaced relationship on said shield plate concentrically around the point where the optical axis of said illuminating device penetrates said shield plate, and opaque straight lines arranged on said shield plate extending radially outwards from said circular lines, said circular lines and said straight lines being arranged so as to provide a substantially even distribution of light on said area of said copying frame.

4. In an illuminating device according to claim 2 wherein said copying frame is arranged at the large base face of a light channel having the form of a truncated pyramid of rectangular cross-section, and a shield plate is arranged at the small base face of said pyramid to shield said pyramid relatively to said light source, said diaphragm being constituted by said shield plate.

5. In an illuminating device comprising a source of light, a copying frame having an area of which is to be illuminated, and mounting means to mount said frame at a predetermined distance from said light source with said light source lying substantially symmetrical with respect to said area, a diaphragm interposed in the light path between said light source and said area, said diaphragm consisting of transparent material and having opaque circular lines arranged in spaced relationship concentrically around a point where the optical axis of said illuminating device penetrates said diaphragm, and said diaphragm further having groups of opaque straight lines beginning at different circular lines and extending radially outwards from said circular lines, the density of the straight lines beginning at the circular line adjacent the innermost of said circular lines being considerably greater than the density of the straight lines beginning at the innermost of said circular lines to produce an innermost zone of relatively low line density and an adjacent zone of greater line density which, owing to the natural course of the lines, merges outwards into a zone of relatively low line density.

6. In an illuminating device comprising a source of light, a copying frame having an area of which is to be illuminated, and mounting means to mount said frame at a predetermined distance from said light source with said light source lying substantially symmetrical with respect to said area, a diaphragm interposed in the light path between said light source and said area, said diaphragm consisting of transparent material and having opaque circular lines arranged in spaced relationship concentrically around a point where the optical axis of said illuminating device penetrates said diaphragm, the outer ones of said circular lines having interruptions to form fragmentary circles, and said diaphragm further having groups of opaque straight lines beginning at different circular lines and extending radially outwards from said circular lines, the density of the straight lines beginning at the circular line adjacent the innermost of said circular lines being considerably greater than the density of the straight lines beginning at the innermost of said circular lines to produce an innermost zone of relatively low line density and an adjacent zone of greater line density which, owing to the natural course of the lines, merges outwards into a zone of relatively low line density.

7. In an illuminating device according to claim 5 wherein said copying frame is arranged at the large base face of a light channel having the form of a truncated pyramid of rectangular cross-section, and a shield plate is arranged at the small base face of said pyramid to shield said pyramid relatively to said light source, said diaphragm being constituted by said shield plate.

8. In an illuminating device according to claim 6 wherein said copying frame is arranged at the large face of a light channel having the form of a truncated pyramid of rectangular cross-section, and a shield plate is arranged at the small base face of said pyramid to shield said pyramid relatively to said light source, said diaphragm being constituted by said shield plate.

References Cited by the Examiner

UNITED STATES PATENTS 2,356,694  8/1944  Potter et al. _____ 88—108 X
3,020,395  2/1962  Pletz.

NORTON ANSHER, *Primary Examiner.*

R. A. WINTERCORN, *Assistant Examiner.*